(12) United States Patent
Ito (10) Patent No.: US 7,349,186 B2
(45) Date of Patent: Mar. 25, 2008

(54) MAGNETIC READ HEAD

(75) Inventor: Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 11/015,650

(22) Filed: Dec. 20, 2004

(65) Prior Publication Data

US 2005/0157434 A1 Jul. 21, 2005

(30) Foreign Application Priority Data

Jan. 20, 2004 (JP) .............................. 2004-012174

(51) Int. Cl.
*G11B 5/33* (2006.01)
*G11B 5/39* (2006.01)
(52) U.S. Cl. ............. 360/324.2; 338/32 R; 324/207.21
(58) Field of Classification Search ..... 360/324–324.2, 360/322; 324/207.21; 365/158; 338/32 R
See application file for complete search history.

(56) References Cited

U.S. PATENT DOCUMENTS

| | | | | |
|---|---|---|---|---|
| 6,330,137 | B1 * | 12/2001 | Knapp et al. | 360/324.2 |
| 6,351,408 | B1 * | 2/2002 | Schwarzl et al. | 365/158 |
| 6,603,677 | B2 * | 8/2003 | Redon et al. | 365/158 |
| 6,671,141 | B2 * | 12/2003 | Shimazawa et al. | 360/324.2 |
| 6,687,099 | B2 * | 2/2004 | Nakatani et al. | 360/324.2 |
| 6,717,780 | B2 * | 4/2004 | Hiramoto et al. | 360/324.2 |
| 6,767,655 | B2 * | 7/2004 | Hiramoto et al. | 428/811.2 |
| 6,909,129 | B2 * | 6/2005 | Kim et al. | 257/295 |
| 2001/0021125 | A1 * | 9/2001 | Nishimura | 365/173 |
| 2001/0033464 | A1 * | 10/2001 | Shimazawa et al. | 360/324.2 |
| 2002/0084500 | A1 * | 7/2002 | Kang et al. | 257/421 |
| 2006/0262458 | A1 * | 11/2006 | Carey et al. | 360/324.2 |

OTHER PUBLICATIONS

Matsuzaki, Mikio et al., "Making a Prototype TMR Head: the Arrangement of a Hard Magnetic Layer a Key", Nikkei Electronics, No. 774 (2000), pp. 177-184, with 9 pages of English translation of the relevant portion.
Jedema et al, "Electrical Detection of Spin Precession in a Metallic Mesoscopic Spin Valve", Nature, vol. 416 (Apr. 18, 2002), pp. 713-716.

\* cited by examiner

*Primary Examiner*—Brian E. Miller
*Assistant Examiner*—Matthew G. Kayrish
(74) *Attorney, Agent, or Firm*—Reed Smith LLP; Stanley P. Fisher, Esq.; Juan Carlos A. Marquez, Esq.

(57) ABSTRACT

A TMR head capable of reconciling high output with high band width is implemented. To that end, two multilayered films each comprised of an insulating layer and a ferromagnetic layer are formed at different locations on an electrode layer, and a current is caused to flow from the ferromagnetic layer of a first multilayered film to the electrode layer while polarized spin is diffused up to a portion of the electrode layer, directly underneath the other multilayered film comprised of the insulating layer and the ferromagnetic layer, thereby detecting a change in resistance, according to a change in the magnetization direction of the ferromagnetic layer of a second multilayered film by use of a circuit extremely large in input impedance, such as a FET.

9 Claims, 7 Drawing Sheets

AIR BEARING SURFACE

MAGNETIC READ HEAD

CLAIM OF PRIORITY

The present application claims priority from Japanese application JP 2004-012174 filed on Jan. 20, 2004, the content of which is hereby incorporated by reference into this application.

FIELD OF THE INVENTION

The invention relates to a hard disk drive for writing information to a magnetic recording medium, and reading information from the magnetic recording medium, and a magnetic head mounted on the hard disk drive.

BACKGROUND OF THE INVENTION

With advances made in the trend toward higher storage density of a magnetic head device, a track size for recording bits has kept on advancing toward miniaturization, and as a result, there has been an increasing demand for higher sensitivity with respect to a magnetic read head. As described in "Nikkei Electronics", Vol. No. 774, (Jul. 17, 2000), pp, 177-184 (Non-patent Document 1), attention has lately been focused particularly on a magnetic read head, using a tunnel magneto-resistance (TMR) effect film, as a supersensitive magnetic sensor of the next generation. In Non-patent Document 1, there is disclosed a head structure wherein after fabricating a multilayered film formed by sequentially depositing an electrode, a soft magnetic free layer, a non-magnetic insulating layer, a ferromagnetic pinned layer, an antiferromagnetic layer for pinning the magnetization direction of the ferromagnetic pinned layer, and an electrode on a lower magnetic shield, the multilayered film is patterned so as to provide both sides thereof with a hard magnetic layer for stabilizing the magnetization direction of a non-magnetic free layer, and an insulating film for insulating an upper magnetic shield from the lower magnetic shield.

Further, as disclosed in, for example, Nature, Vol. 416, pp. 713 to 715, 2002 (Non-patent Document 2), there has lately been proposed a new type of TMR sensor, as a sensor making use of the TMR effect, wherein two multilayered films each comprised of an insulating layer and a ferromagnetic layer are formed at different locations on an Al metal electrode layer, and a current is caused to flow from the ferromagnetic layer of a first multilayered film to the Al metal electrode layer while polarized spin is diffused up to a portion of the Al metal electrode layer, directly underneath the other multilayered film comprised of the insulating layer and the ferromagnetic layer, thereby detecting a change in resistance, according to a change in the magnetization direction of the ferromagnetic layer of a second multilayered film.

[Non-patent Document 1] "Nikkei Electronics", Vol. No. 774, pp. 177-184

[Non-patent Document 2] Nature, Vol. 416, pp. 713 to 715, 2002

SUMMARY OF THE INVENTION

The conventional examples described as above have the following problems. First, in Non-patent Document 1, there is disclosed a sensor film having low resistance and a high MR ratio at room temperature. With a TMR head for use as an ultra-high-density magnetic read head in the future, it is necessary to decrease a distance between the upper magnetic shield and the lower magnetic shield as much as possible in order to enhance read resolution, and accordingly, the TMR head has a structure wherein a lower electrode is formed directly on the lower magnetic shield and on top of the lower electrode, there are formed the antiferromagnetic layer, a lower ferromagnetic layer, a barrier layer, an upper ferromagnetic layer and an upper electrode. Further, the upper electrode is directly connected to the upper magnetic shield. A detection current is fed via the upper and lower shields. In the case of the structure described, a detection signal has a band proportional to the reciprocal of the product of resistance R between the electrodes of the TMR head, and capacitance C between the upper and lower magnetic shields. It is therefore necessary to render the product RC to an extremely small value in order to implement higher-speed transfer in the future. However, with more advances in the trend toward higher density, a magnetic recording medium keeps decreasing in track width, so that as the density thereof becomes higher, so a value R proportional to a sensor area will increase. In order to commercialize a TMR head suitable for use in a hard disk drive of an ultra-high recording density in the future by getting around such a fundamental problem as described, it is necessary to decrease head resistance to an extremely small value, and to that end, the film thickness of an Al oxide constituting a non-magnetic insulating layer needs to be rendered extremely small, which is, however, extremely difficult to achieve from the industrial viewpoint.

Further, with the TMR sensor as described in Non-patent Document 2, since there is no need for causing a current to flow to the second ferromagnetic layer/the insulating layer, for use in signal detection, it is unnecessary to cause a current to flow between the upper and lower shields, large in area. Consequently, there is a possibility of getting around a band problem as described above because the capacity C between lines can be considerably reduced. With this sensor, however, a detected signal is taken out as a change in voltage so that the detection circuit of the conventional magnetic read head, based on current flow, cannot be used, thereby requiring a signal detection circuit unique to this magnetic sensor.

It is therefore an object of the invention to provide a high performance signal detection circuit capable of coping with a new type of TMR sensor wherein two multilayered films each comprised of an insulating layer and a ferromagnetic layer are formed at different locations on an electrode layer, and a current is caused to flow from the ferromagnetic layer of a first multilayered film to the electrode layer while polarized spin is diffused up to a portion of the electrode layer, directly underneath the other multilayered film comprised of the insulating layer and the ferromagnetic layer, thereby detecting a change in resistance, according to a change in the magnetization direction of the ferromagnetic layer of a second multilayered film, so that a TMR head capable of reconciling high output with high band width is implemented.

A magnetic head according to the invention comprises a first electrode layer, a first ferromagnetic layer (free layer) deposited over the first electrode layer, on a side thereof, adjacent to an air bearing surface, with a first insulating layer interposed therebetween, a second ferromagnetic layer (pinned layer) deposited over the first electrode layer, at a location away from the air bearing surface, with a second insulating layer interposed therebetween, an electrode for causing a tunneling current to flow from the first electrode layer to the second ferromagnetic layer via the second insulating layer, and a signal detection circuit for detecting voltage change occurring between the first ferromagnetic layer and the first electrode layer, due to change in the magnetization direction of the first ferromagnetic layer, occurring by a magnetic field impressed on the first ferromagnetic layer by a medium, wherein the signal detection circuit has input impedance against AC input, greater than impedance of a multilayered body of the first insulating layer, and the first ferromagnetic layer (free layer). The input impedance of the signal detection circuit, against the AC input, is at least 10 times greater than the impedance of the multilayered body of the first insulating layer, and the first ferromagnetic layer (free layer), and is preferably not less than 100 times greater.

The signal detection circuit according to one example may comprise a field effect transistor, and an output voltage from the first ferromagnetic layer is delivered to the gate terminal of the field effect transistor while a detection signal is taken out from the source terminal of the field effect transistor. The signal detection circuit according to another example may comprise a bipolar transistor, and an output voltage from the first ferromagnetic layer is delivered to the base terminal of the bipolar transistor while a detection signal is taken out from the emitter terminal of the field effect transistor. The signal detection circuit according to still another example may comprise an operational amplifier, and an output voltage from the first ferromagnetic layer is delivered to one of the input terminals of the operational amplifier.

Further, a magnetic head according the invention may comprise a semiconductor layer having a source region, a gate region, and a drain region, a first insulating layer deposited over a first ferromagnetic layer (free layer), on a side thereof, adjacent to an air bearing surface, a second insulating layer deposited over a second ferromagnetic layer (pinned layer) deposited over the first electrode layer, at a location away from the air bearing surface, a common electrode layer formed so as to be extended between the first insulating layer, and the second insulating layer, and an electrode for causing a tunneling current to flow from the common electrode layer to the second ferromagnetic layer via the second insulating layer, wherein the first ferromagnetic layer is electrically continuous with the gate region of the semiconductor layer. Electrical continuity between the first ferromagnetic layer (free layer), and the gate region of the semiconductor layer may be effected by forming the first ferromagnetic layer (free layer) directly on the gate region of the semiconductor layer, or by forming a gate electrode on the gate region of the semiconductor layer, and by forming the first ferromagnetic layer (free layer) on the gate electrode.

A magnetic head according to the invention is preferably fabricated by installing an induction-type thin-film magnetic write head comprising a lower magnetic core, an upper magnetic core magnetically connected to the lower magnetic core at the air bearing surface through the intermediary of a magnetic gap film, and directly connected to the lower magnetic core at a location away from the air bearing surface with a back contact formed of a magnetic material, interposed therebetween, and thin film coils magnetically connected to a magnetic circuit comprised of the upper magnetic core, the back contact, and lower magnetic core, in addition to the magnetic read head described above.

Thus, the invention can provide a magnetic head capable of attaining a high transfer speed in a high bandwidth, and with supersensitivity, and a hard disk drive with an ultra high density for driving the same.

BRIEF DESCRIPTION OF THE DRAWINGS

FIGS. 1A and 1B are views showing a first embodiment of a magnetic read head according to the invention, in which

FIGS. 2A and 2b are views showing the operation principle of the magnetic read head according to the invention, in which

FIGS. 3A to 3C are circuit diagrams showing a first example of a detection circuit for the magnetic read head according to the invention, in which

DETAILED DESCRIPTION OF THE PREFERRED EBODIMENTS

Embodiments of the invention are described hereinafter with reference to the accompanying drawings.

Figure 1A:
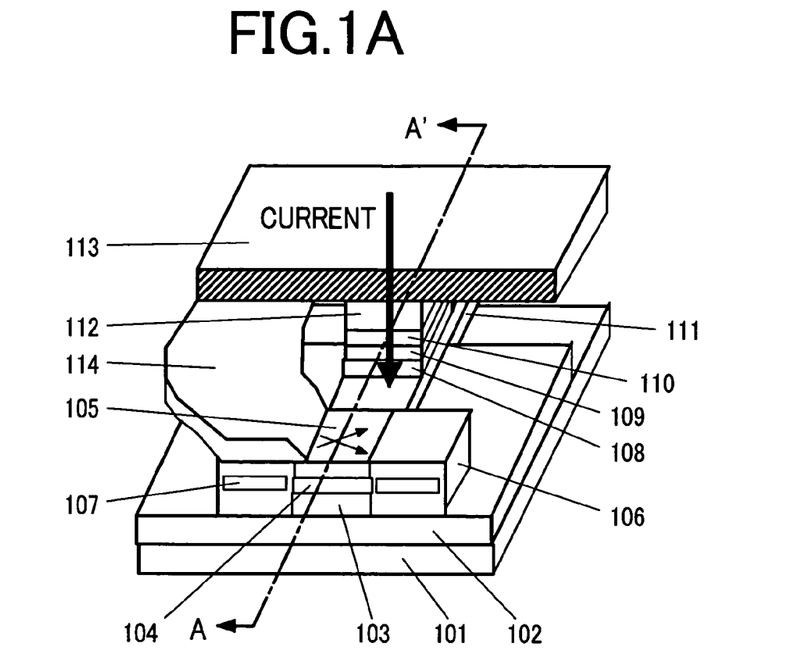
FIG. 1A is a partially broken-way perspective view.
Figure 1B:
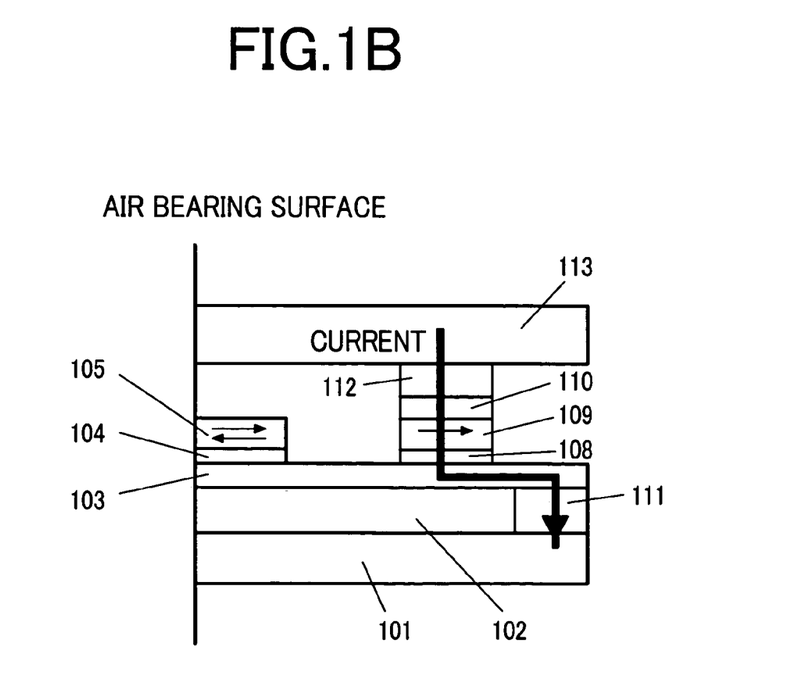
FIG. 1B is a sectional view taken on line A-A' in FIG. 1A.

FIGS. 1A and 1B show a first embodiment of a magnetic read head according to the invention. FIG. 1A is a perspective view showing the magnetic read head according to the first embodiment of the invention, and FIG. 1B is a sectional view taken on line A-A' in FIG. 1A.

In FIG. 1A, an insulating layer 102 is formed on a lower magnetic shield 101, and a first electrode layer 103 is formed on the insulating layer 102. Further, over the first electrode layer 103, on a side thereof, adjacent to an air bearing surface, there are formed a first insulating layer 104, and a first ferromagnetic layer (free layer) 105 while over the first electrode layer 103, at a location away from the air bearing surface, there are deposited a second insulating layer 108, a second ferromagnetic layer (pinned layer) 109, an antiferromagnetic layer 110 for pinning the magnetization direction of the second ferromagnetic layer 109 in a direction substantially normal to the air bearing surface, and a second electrode layer 112 in that order, and the second electrode layer 112 is electrically continuous with an upper magnetic shield 113. The first electrode layer 103 is electrically continuous with the lower magnetic shield 101 through the intermediary of a third electrode layer 111 provided at the location away from the air bearing surface. On both sides of the first ferromagnetic layer (free layer) 105, there is formed a permanent magnet film 107 for ensuring uniformity in domain structure of the free layer, and causing the magnetization direction thereof to be oriented in a direction substantially parallel with the air bearing surface through the intermediary of an insulating layer 106. The first ferromagnetic layer 105 is provided with an electrode 114 for detecting voltage change occurring due to the TMR effect so as to be in contact with the former. A current flows through the second electrode layer 112—the antiferromagnetic layer 110—the second ferromagnetic layer 109—the second insulating layer 108—the first electrode layer 103—the third electrode layer 111 to the lower magnetic shield 101. A detection voltage due to the TMR effect is observed as s voltage change occurring between the first electrode layer 103 and the electrode 114 provided so as to be in contact with the first ferromagnetic layer 105.

Figure 2A:
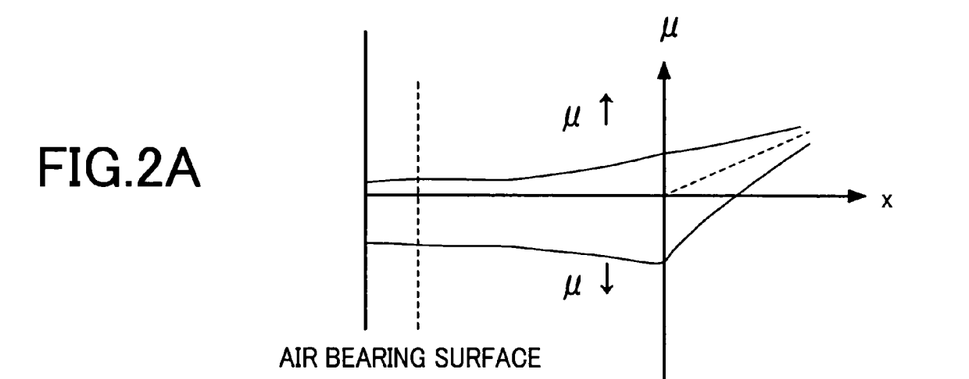
FIG. 2A is view showing space distribution of polarized spin electrons.
Figure 2B:
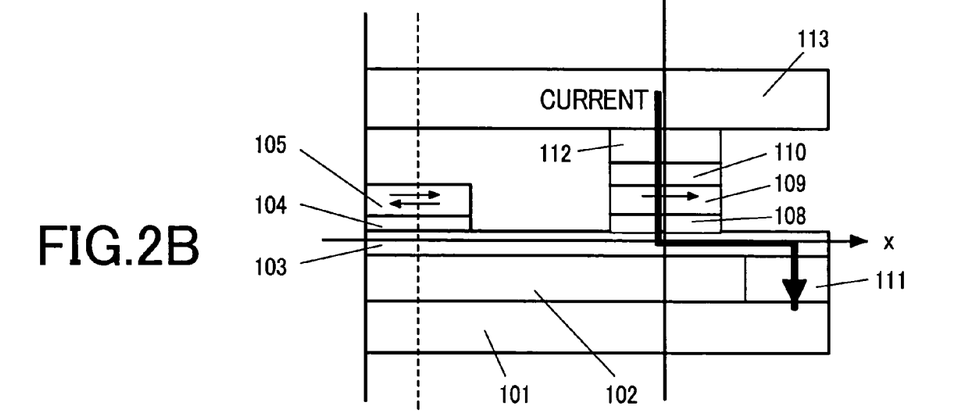
FIG. 2B is a sectional view of the head.

Next, operation of the magnetic read head is described hereinafter with reference to FIGS. 2A and 2B. FIG. 2A indicates the densities of up spin ($\mu\uparrow$) and down spin ($\mu\downarrow$), respectively, at the position of the x coordinate set inside the first electrode layer 103 shown in FIG. 2B, x=0 corresponding to the center of the second ferromagnetic layer 109 shown in FIG. 2B. Now, when the current is caused to flow from the upper magnetic shield 113 to the lower magnetic shield 101 as described above, since the second ferromagnetic layer 109 is a ferromagnet, up-spin electrons and down-spin electrons, differing in number from each other are injected from the second ferromagnetic layer 109 into the first electrode layer 103. In this case, since a negatively polarized material is assumed as a ferromagnetic material, the down-spin electrons more in number than the up-spin electrons are injected into the first electrode layer 103. In the case where the first electrode layer 103 is made of material such as, for example, aluminum, which is large in spin diffusion length even at room temperature, these spin electrons are diffused toward the first ferromagnetic layer (free layer) 105 where no current flows. Directly underneath the center of the first ferromagnetic layer 105, indicated by a dotted line in the figure, there is maintained a state where the number of the down-spin electrons is still greater than that of the up-spin electrons although the number of the former decreases. This is a state where the first electrode layer 103 is assumed to have effectively undergone spin polarization, and occurrence of a change in the MR ratio depending on the direction of magnetization of the first ferromagnetic layer 105 located over the first electrode layer 103, that is, the so-called the tunnel magneto-resistance (TMR) effect is observed. With a structure according to the invention, the current flows from the upper magnetic shield 113 to the lower magnetic shield 101 through the second ferromagnetic layer 109/the second insulating layer 108, non-detection unit, and TMR unit, respectively. The upper and lower magnetic shields, having a large area, respectively, are not connected to the ferromagnetic layer 105/the insulating layer 104, a signal detection unit, respectively, and the insulating layer 104 is very small in area, so that capacitance therebetween can be rendered very small.

Figure 3A:
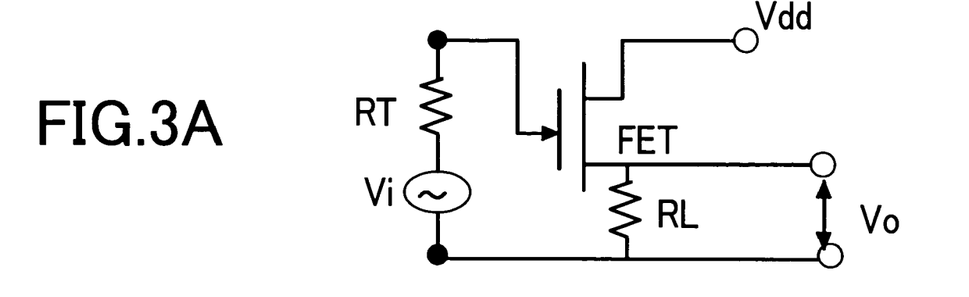
FIG. 3A shows a case of the detection circuit using a field effect transistor.
Figure 3B:
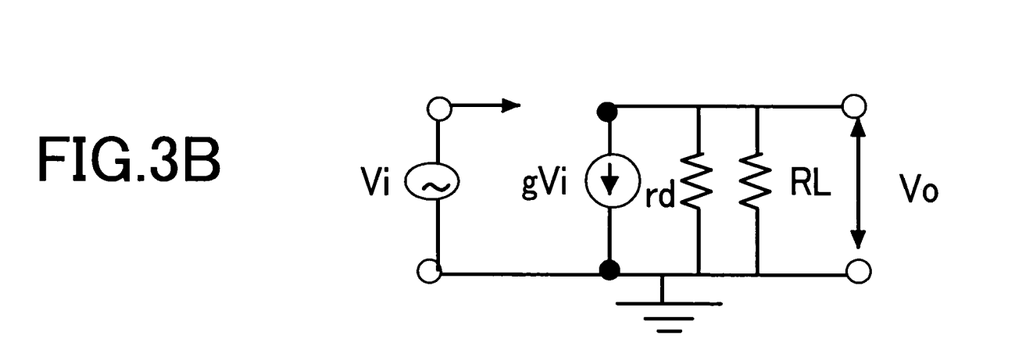
FIG. 3B is an equivalent circuit of the circuit shown in FIG. 3A.

FIG. 3A is a circuit diagram showing a first example of a signal detection circuit suitable for a TMR head according to the first embodiment of the invention, and FIG. 3B is an equivalent circuit thereof. In FIG. 3A, Vi denotes an output voltage from the TMR head according to the first embodiment, RT tunneling resistance of the first insulating layer 104, RL output resistance connected a field effect transistor (FET), and Vdd a power source voltage of the FET. In the detection circuit, since the output voltage from the TMR head is impressed on the gate of the FET, an output impedance as seen from the TMR head reaches an extremely large value, so that no current flows to the first insulating layer 104/the first ferromagnetic layer (free layer) 105 of the TMR head. Meanwhile, an output can be expressed by a circuit having a power source gV1 and an output impedance (rd*RL)/(rd+RL+g*Vi*RL) as shown in the equivalent circuit of FIG. 3B. For example, in the case of a typical FET, on the assumption of mutual conductance gm=5 (mS), and rd=30 kW, if the output resistance RL is kept equal to FET resistance rd, the output impedance is found at 197 W, which is a value less than that for the TMR head although higher than the output resistance of the conventional CMR head, and is not dependent on an area of a barrier layer. Thus, it is possible to resolve a fundamental problem with the TMR head that with advances being made toward higher density, the output impedance increases, thereby causing a band to deteriorate. Furthermore, as a voltage gain of the detection circuit is substantially 1, the output voltage of the detection circuit Vo=Vi. Accordingly, by connecting a detection circuit of the conventional CMR head, as it is, to the back stage of this detection circuit, an output from the TMR head in FIG. 1, as it is, can be detected. As a result, it becomes unnecessary to newly develop a large-scale detection LSI for the TMR head in FIG. 1, so that the merit of reduction in cost is gained.

Figure 3C:
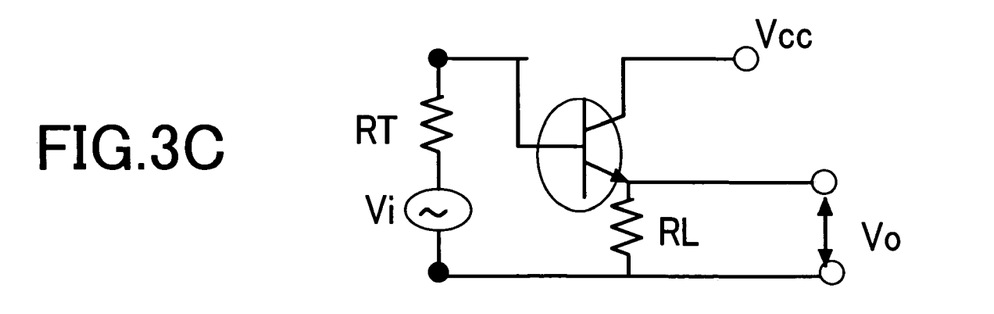
FIG. 3C shows a case of the detection circuit using a bipolar transistor.

With the embodiment described as above, there is shown an example where the FET is used in the detection circuit. However, as shown FIG. 3C, a bipolar transistor may be used in place of the FET. In such a case, a gate input of the FET is connected to the base terminal of the bipolar transistor, a drain input to the collector terminal thereof, and a source output to the emitter terminal thereof, respectively. The same effect as that in the case of using the FET is gained in this case as well.

Figure 4:
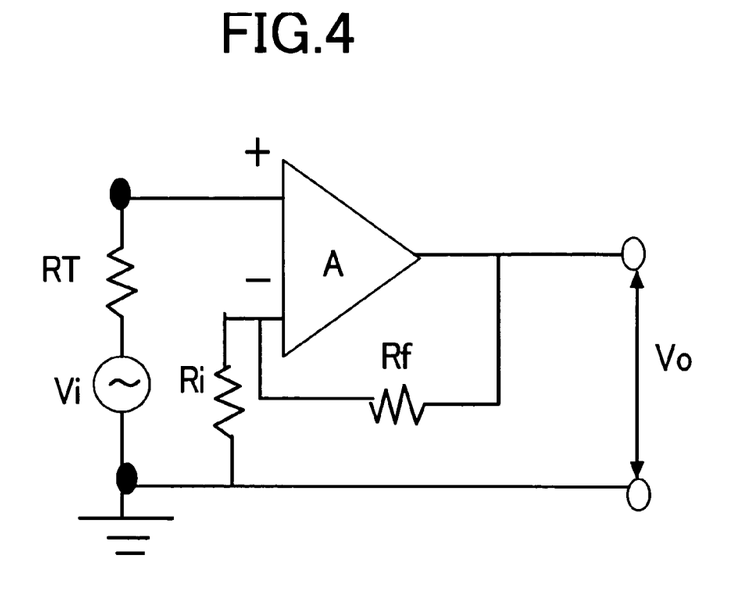
FIG. 4 is a circuit diagram showing a second example of the signal detection circuit for the magnetic read head according to the invention.

FIG. 4 is a circuit diagram showing a second example of the signal detection circuit suitable for the TMR head according to the first embodiment of the invention. The output voltage from the TMR head is connected to the positive side terminal of an operational amplifier A. Since the operational amplifier has extremely high input impedance, no current flows to the first insulating layer 104/the first ferromagnetic layer (free layer) 105. An output voltage from this circuit is represented by Vo=(Ri +Rf)/Ri*Vi, and output impedance is extremely small. Accordingly, by suitably setting resistances Rf, Ri, amplifying the output Vi from the TMR head with this circuit, and further, connecting an output of this circuit, as it is, to the detection circuit of the conventional CMR head, it is possible to detect the output of the TMR head in FIG. 1. In the case of this example as well, it is also possible as with the case of the first example to resolve the fundamental problem with the TMR head that with advances being made toward higher density, the output impedance increases, thereby causing the band to deteriorate.

Figure 5:
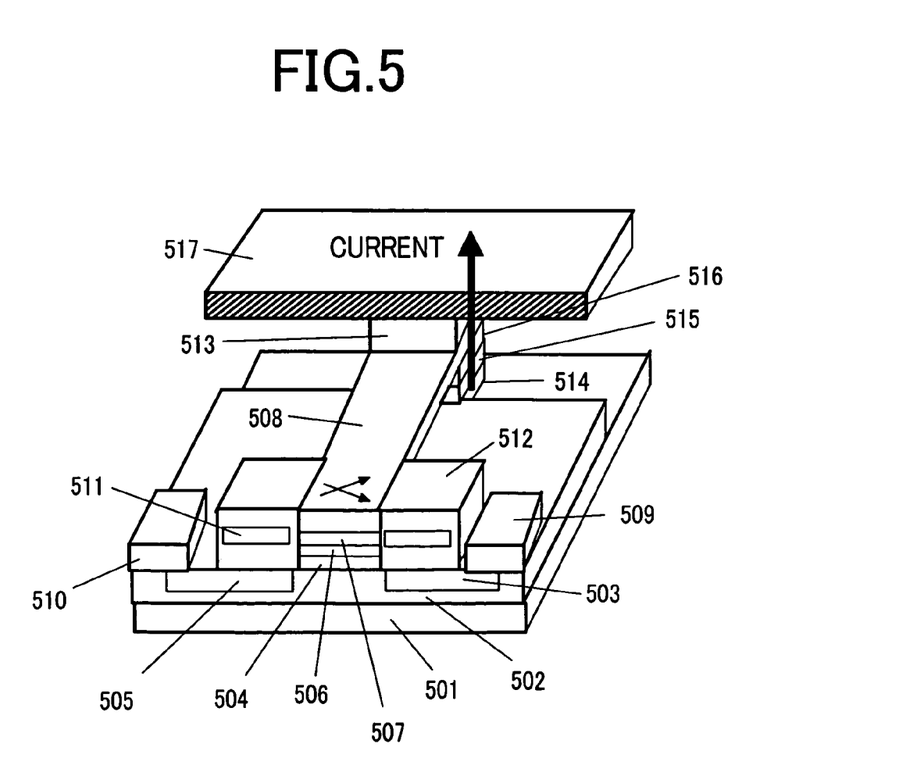
FIG. 5 is perspective view showing a second embodiment of a magnetic read head according to the invention.

FIG. 5 is perspective view showing a second embodiment of a TMR head according to the invention. In FIG. 5, a semiconductor layer 502 is formed over a lower magnetic shield 501, and a source electrode 503, and a drain electrode 505 are formed inside the semiconductor layer 502 on a side thereof, adjacent to an air bearing surface. A gate region is formed between the source and the drain. Further, over the semiconductor layer 502, there are formed a gate electrode 504 connected to the gate region, a first ferromagnetic layer (free layer) 506, and a first insulating layer 507 in that order. At a location away from the air bearing surface, there are deposited a second insulating layer 516, a second ferromagnetic layer (pinned layer) 515, and a second electrode layer 514 in a retrograde order, and the second electrode layer 514 is electrically continuous with the lower magnetic shield 501. Further, on top of the first and second insulating layers, there is provided a common electrode layer 508 interconnecting the first and second insulating layers, and the common electrode layer 508 is electrically continuous with an upper shield 517 via an electrode layer 513. On both sides of the first ferromagnetic layer (free layer) 506, there is formed, through the intermediary of an insulating layer 512, a permanent magnet layer 511 for equalizing a domain structure of the free layer, and orienting the magnetization direction thereof so as to be substantially parallel with the air bearing surface. Electrode layers 509, 510 are in contact with a source 503, and a drain 505 so as to be connected therewith, respectively.

A current for use in detection flows from the lower magnetic shield 501 to the upper shield 517 via the second electrode layer 514, the second ferromagnetic layer (pinned layer) 515, the second insulating layer 516, the common electrode layer 508, and the electrode layer 513. A change in detection voltage, due to the TMR effect, is turned into a change in the voltage of the gate electrode 504 provided so as to be in contact with the first ferromagnetic layer (free layer) 506, and such a change in the voltage will cause a change to occur to a current flowing between the source and the drain, thereby finally executing detection by detecting a change in the current. The present embodiment has, in a sense, a structure wherein the TMR head and the FET, as described in the first embodiment, are integrated with each other, thereby eliminating the needs for such particular detection circuits as described with reference to FIGS. 3A, 3B, 3C, and FIG. 4, respectively.

Figure 6:
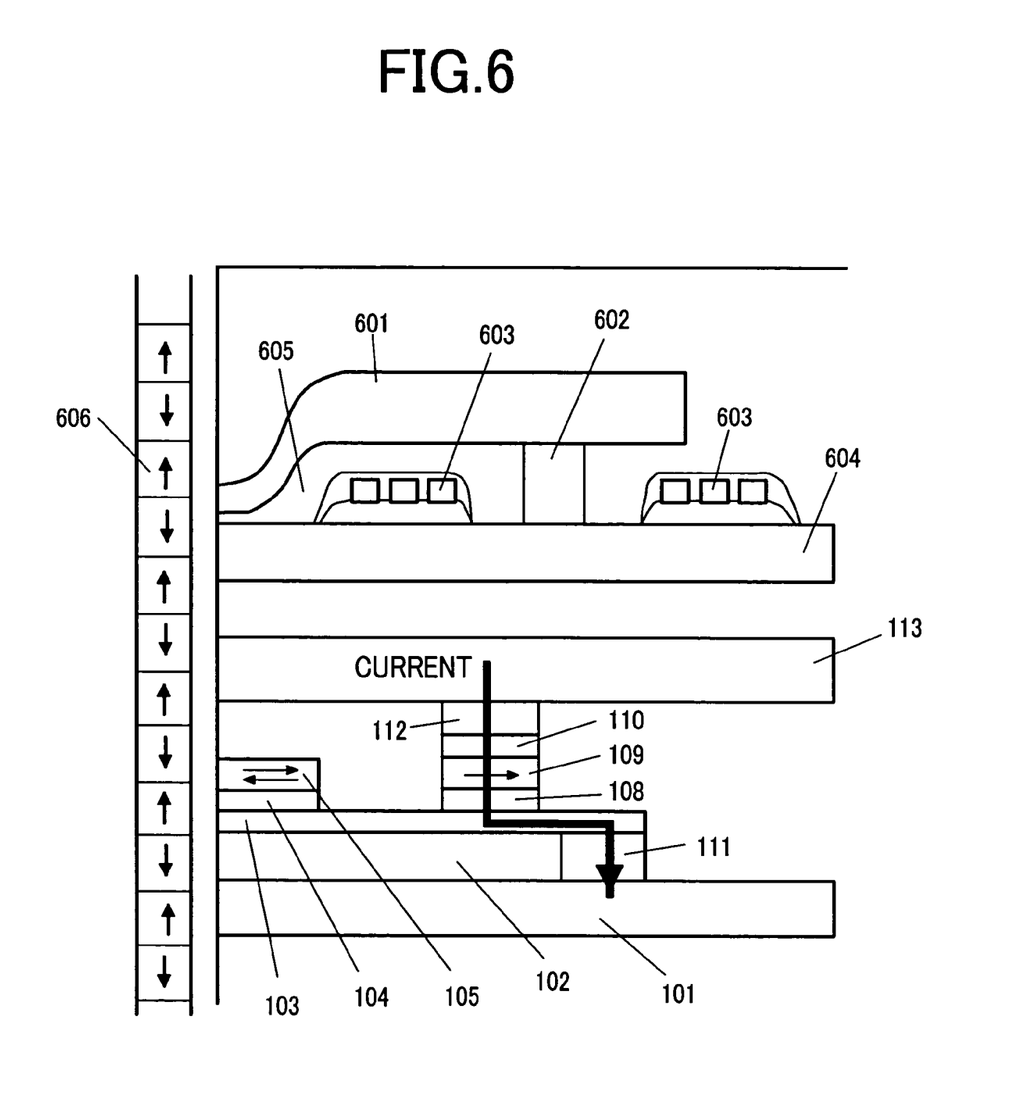
FIG. 6 is a sectional view showing an example of the magnetic head according to the invention, comprising a TMR effect type magnetic write head, and the magnetic read head for longitudinal magnetic recording.

FIG. 6 shows an example of a magnetic head fabricated by forming an induction-type magnetic write head over the magnetic read head according to any of the embodiments described hereinbefore. In FIG. 6, there is shown an example wherein the magnetic read head according to the first embodiment, shown in FIG. 1 is applied by way of example, however, in the case of using the magnetic read head according to the other embodiments, a similar magnetic head can be fabricated by simply replacing a magnetic read head part thereof.

In FIG. 6, after forming the magnetic read head, shown in FIG. 1, on the substrate, there is formed a non-magnetic insulating layer, over which an upper magnetic core 601 connected to a lower magnetic core 604 is formed with the lower magnetic core 604 and s back contact 602, interposed therebetween. Coils 603 for use in inducing magnetic fluxes to the magnetic cores are provided around the back contact 602 in such a way as to be surrounded by an insulating layer 605. The magnetic head described as above is placed in close proximity of a longitudinal magnetic recording medium 606 to be magnetized in the longitudinal direction for executing read/write of information.

Figure 7:
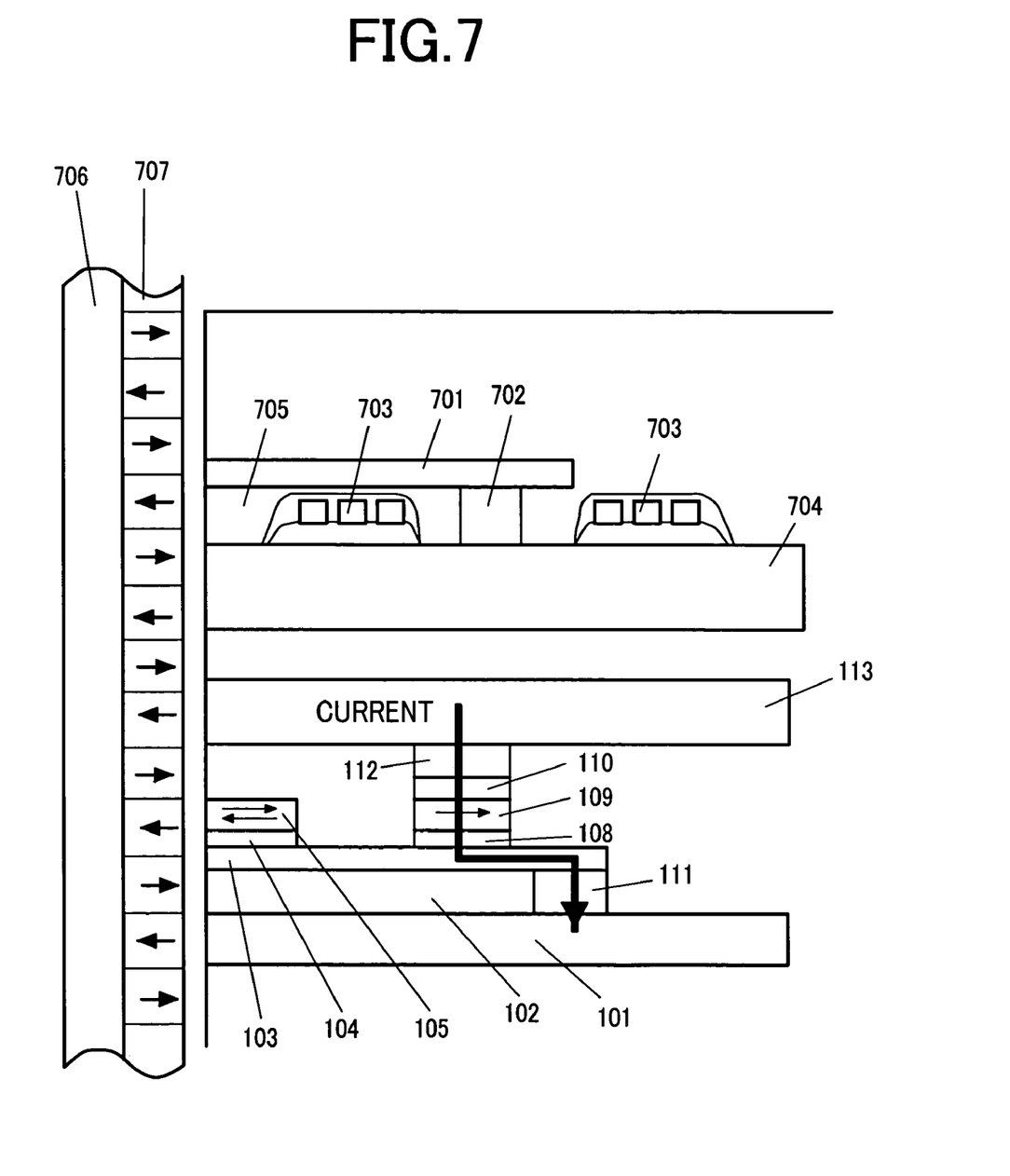
FIG. 7 is a sectional view showing another example of the magnetic head according to the invention, comprising the TMR effect type magnetic write head, and a single-pole-type magnetic head for perpendicular magnetic recording.

FIG. 7 shows an example of a magnetic head fabricated by forming a single-pole-type magnetic head for perpendicular magnetic recording over the magnetic read head according to any of the embodiments described hereinbefore. In FIG. 7, there is shown an example wherein the magnetic read head according to the first embodiment, shown in FIG. 1 is applied by way of example, however, in the case of using the magnetic read head according to the other embodiments, a similar magnetic head can be fabricated by simply replacing a TMR type magnetic read head part of the former.

In FIG. 7, after forming the magnetic read head, shown in FIG. 1, on the substrate, there is formed a non-magnetic insulating layer, over which a single-pole-type upper magnetic core 701 connected to a lower magnetic core 704 is formed with the lower magnetic core 704 and s back contact 702, interposed therebetween. Coils 703 for use in inducing magnetic fluxes to the magnetic cores are provided around the back contact 702 in such a way as to be surrounded by an insulating layer 705. The magnetic head described as above is placed in close proximity of a perpendicular magnetic recording medium comprised of a perpendicular magnetic recording layer 707 to be magnetized in the direction perpendicular to the surface of the medium, and a soft magnetic lining layer 706 to thereby execute read/write of information.

Figure 8:
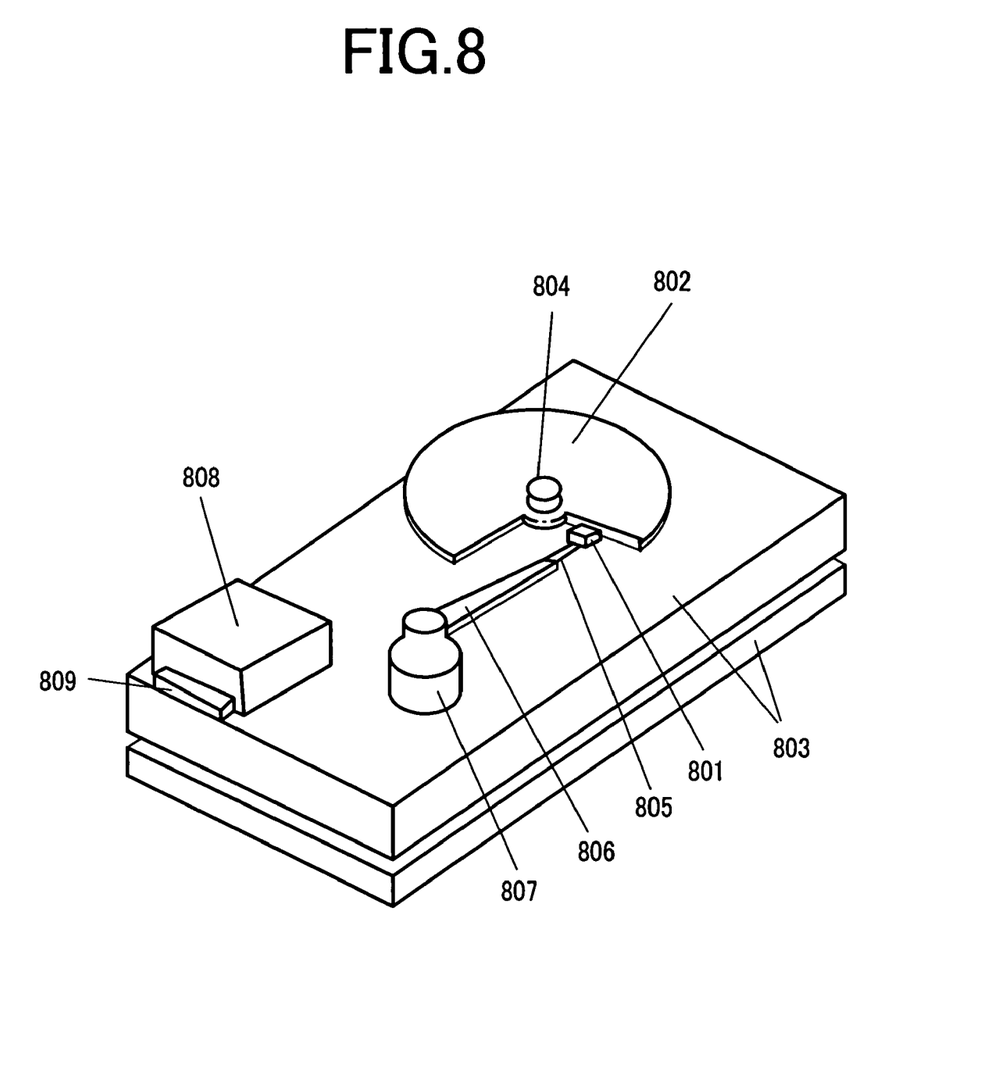
FIG. 8 is a schematic representation of a hard disk drive according to the invention.

FIG. 8 is a schematic representation of a hard disk drive comprising a slider 801 with the magnetic read head and the magnetic write head, described in the embodiments by referring to FIGS. 1 to 7, respectively, mounted thereon, and a recording platter 802. The recording platter 802 is attached to a spindle 804 connected to a spindle motor (not shown in FIG. 8) securely attached to a base 803. The recording platter 802 is driven for rotation by rotation of the spindle, making a relative motion against the slider 801. The slider 801 is fixed to a suspension 805, and the suspension 805 is further attached to an arm 806. An actuator mechanism 807 causes the arm 806 to rotatively reciprocates around the spindle 804 such that the slider 801 is shifted in the radial direction of the recording platter 802, thereby making access to information tracks, and tracking motions against predetermined information tracks. A connector 809 is connected to an interface 808 attached to the base 803, and power supply for driving the hard disk drive, input of read-write instructions to the hard disk drive, input of write information, and output of read information, and so forth are implemented via a cable connected to the connector 809.

What is claimed is:

1. A magnetic head comprising:
   a first electrode layer;
   a free layer composed of a first ferromagnetic layer deposited over the first electrode layer, on a side thereof, adjacent to an air bearing surface, with a first insulating layer interposed therebetween;
   a pinned layer composed of a second ferromagnetic layer deposited over the first electrode layer, at a location away from the air bearing surface, with a second insulating layer interposed therebetween;
   an electrode for causing a tunneling current to flow from the first electrode layer to the second ferromagnetic layer via the second insulating layer; and
   a signal detection circuit for detecting voltage change occurring between the first ferromagnetic layer and the first electrode layer, due to change in the magnetization direction of the first ferromagnetic layer, occurring by a magnetic field impressed on the first ferromagnetic layer by a medium,
   wherein the signal detection circuit has input impedance against AC input, greater than impedance of a multi-layered body of the first insulating layer, and the free layer.

2. A magnetic head according to claim 1, wherein the signal detection circuit comprises a field effect transistor, an output voltage from the first ferromagnetic layer is delivered to the gate terminal of the field effect transistor, and a detection signal is taken out from the source terminal of the field effect transistor.

3. A magnetic head according to claim 1, wherein the signal detection circuit comprises a bipolar transistor, an output voltage from the first ferromagnetic layer is delivered to the base terminal of the bipolar transistor, and a detection signal is taken out from the emitter terminal of the field effect transistor.

4. A magnetic head according to claim 1, wherein the signal detection circuit comprises an operational amplifier, and an output voltage from the first ferromagnetic layer is delivered to one of the input terminals of the operational amplifier.

5. A magnetic head comprising:
a lower magnetic shield;
an upper magnetic shield;
a first multilayered body deposited between the lower magnetic shield and the upper magnetic shield, which is facing toward an air bearing surface;
a second multilayered body deposited between the lower magnetic shield and the upper magnetic shield, which is arranged in a region away from the air bearing surface;
a semiconductor layer including a source region, a gate region, and a drain region, which is disposed between the first multilayered body and the lower magnetic shield;
a common electrode layer connecting the first multilayered body and the second multilayered body; and
a pair of electrodes disposed adjacent to the source region and the drain region respectively,
wherein said first multilayered body is comprised of a gate electrode deposited on the gate region, a free layer deposited over the gate electrode, and a first insulating layer deposited over the free layer,
said second multilayered body is comprised of a pinned layer and a second insulating layer deposited over the pinned layer, and
said common electrode layer passes spin polarized electrons injected by the second multilayered body to the first multilayered body.

6. A magnetic head comprising a magnetic read head and an induction-type thin-film magnetic write head;
said magnetic read head comprising:
a first electrode layer;
a free layer composed of a first ferromagnetic layer deposited over the first electrode layer, on a side thereof, adjacent to an air bearing surface, with a first insulating layer interposed therebetween;
a pinned layer composed of a second ferromagnetic layer deposited over the first electrode layer, at a location away from the air bearing surface, with a second insulating layer interposed therebetween;
an electrode for causing a tunneling current to flow from the first electrode layer to the second ferromagnetic layer via the second insulating layer; and
a signal detection circuit for detecting voltage change occurring between the first ferromagnetic layer and the first electrode layer, due to change in the magnetization direction of the first ferromagnetic layer, occurring by a magnetic field impressed on the first ferromagnetic layer by a medium, wherein the signal detection circuit has input impedance against AC input, greater than impedance of a multilayered body of the first insulating layer, and the first free layer; and
said induction-type thin-film magnetic write head comprising:
a lower magnetic core;
an upper magnetic core magnetically connected to the lower magnetic core at the air bearing surface through the intermediary of a magnetic gap film, and directly connected to the lower magnetic core at a location away from the air bearing surface with a back contact formed of a magnetic material, interposed therebetween; and
thin film coils magnetically connected to a magnetic circuit comprised of the upper magnetic core, the back contact, and lower magnetic core.

7. A magnetic head comprising a magnetic read head and an induction-type thin-film magnetic write head;
said magnetic read head comprising:
a lower magnetic shield;
an upper magnetic shield;
a first multilayered body deposited between the lower magnetic shield and the upper magnetic shield, which is facing toward an air bearing surface;
a second multilayered body deposited between the lower magnetic shield and the upper magnetic shield, which is arranged in a region away from the air bearing surface;
a semiconductor layer including a source region, a gate region, and a drain region, which is disposed between the first multilayered body and the lower magnetic shield;
a common electrode layer connecting the first multilayered body and the second multilayered body; and
a pair of electrodes disposed adjacent to the source region and the drain region respectively, wherein said first multilayered body is comprised of a gate electrode deposited on the gate region, a free layer deposited over the gate electrode, and a first insulating layer deposited over the free layer, said second multilayered body is comprised of a pinned layer and a second insulating layer deposited over the pinned layer, and said common electrode layer passes spin polarized electrons injected by the second multilayered body to the first multilayered body; and
said induction-type thin-film magnetic write head comprising:
a lower magnetic core;
an upper magnetic core magnetically connected to the lower magnetic core at the air bearing surface through the intermediary of a magnetic gap film, and directly connected to the lower magnetic core at a location away from the air bearing surface with s back contact formed of a magnetic material, interposed therebetween; and
thin film coils magnetically connected to a magnetic circuit comprised of the upper magnetic core, the back contact, and lower magnetic core.

8. A hard disk drive comprising:
a magnetic recording medium;
a motor for driving the magnetic recording medium for rotation;
a magnetic head with a magnetic read head, and a magnetic write head, mounted thereon:
a magnetic head driver for driving the magnetic head relatively to the magnetic recording medium, and
an interface for executing input/output of a signal against the magnetic head, said magnetic read head comprising:
a first electrode layer;
a free layer composed of a first ferromagnetic layer deposited over the first electrode layer, on a side thereof, adjacent to an air bearing surface, with a first insulating layer interposed therebetween;
a pinned layer composed of a second ferromagnetic layer deposited over the first electrode layer, at a location away from the air bearing surface, with a second insulating layer interposed therebetween;

an electrode for causing a tunneling current to flow from the first electrode layer to the second ferromagnetic layer via the second insulating layer; and a signal detection circuit for detecting voltage change occurring between the first ferromagnetic layer and the first electrode layer, due to change in the magnetization direction of the first ferromagnetic layer, occurring by a magnetic field impressed on the first ferromagnetic layer by a medium, wherein the signal detection circuit has input impedance against AC input, greater than impedance of a multilayered body of the first insulating layer, and the free layer, said magnetic write head comprising:

a lower magnetic core;

an upper magnetic core magnetically connected to the lower magnetic core at the air bearing surface through the intermediary of a magnetic gap film, and directly connected to the lower magnetic core at a location away from the air bearing surface with a back contact formed of a magnetic material, interposed therebetween; and thin film coils magnetically connected to a magnetic circuit comprised of the upper magnetic core, the back contact, and lower magnetic core.

9. A hard disk drive comprising:

a magnetic recording medium;

a motor for driving the magnetic recording medium for rotation;

a magnetic head with a magnetic read head, and a magnetic write head mounted thereon;

a magnetic head driver for driving the magnetic head relatively to the magnetic recording medium, and an interface for executing input/output of a signal against the magnetic, wherein said magnetic read head comprises:

a lower magnetic shield;

an upper magnetic shield;

a first multilayered body deposited between the lower magnetic shield and the upper magnetic shield, which is facing toward an air bearing surface;

a second multilayered body deposited between the lower magnetic shield and the upper magnetic shield, which is arranged in a region away from the air bearing surface;

a semiconductor layer including a source region, a gate region, and a drain region, which is disposed between the first multilayered body and the lower magnetic shield;

a common electrode layer connecting the first multilayered body and the second multilayered body; and a pair of electrodes disposed adjacent to the source region and the drain region respectively, wherein said first multilayered body is comprised of a gate electrode deposited on the gate region, a free layer deposited over the gate electrode, and a first insulating layer deposited over the free layer, said second multilayered body is comprised of a pinned layer and a second insulating layer deposited over the pinned layer, and said common electrode layer passes spin polarized electrons injected by the second multilayered body to the first multilayered body; and wherein said magnetic write head comprises:

a lower magnetic core;

an upper magnetic core magnetically connected to the lower magnetic core at the air bearing surface through the intermediary of a magnetic gap film, and directly connected to the lower magnetic core at a location away from the air bearing surface with a back contact formed of a magnetic material, interposed therebetween; and thin film coils magnetically connected to a magnetic circuit comprised of the upper magnetic core, the back contact, and lower magnetic core.

* * * * *